Aug. 11, 1936.   R. T. GLASCODINE   2,050,604
CENTRAL BUFFING AND DRAFT GEAR
Filed Nov. 8, 1934   2 Sheets-Sheet 1
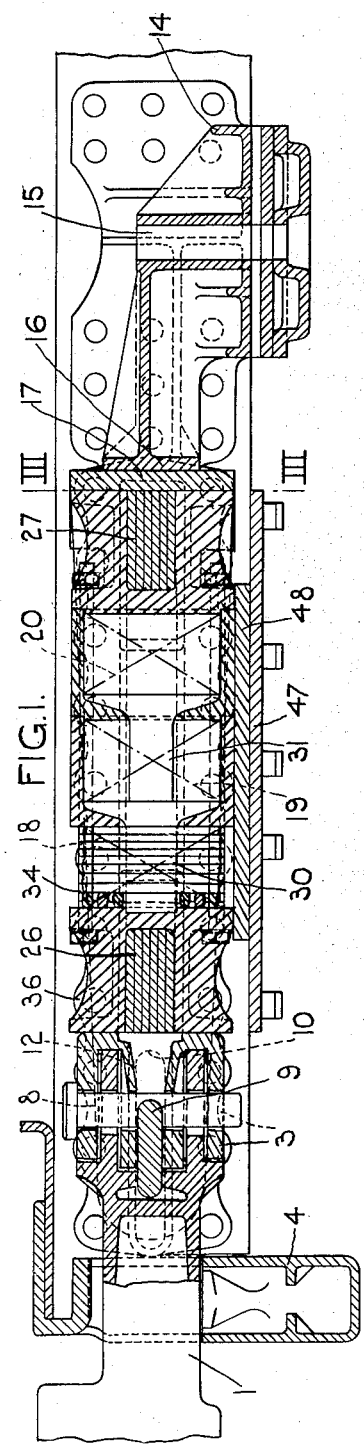
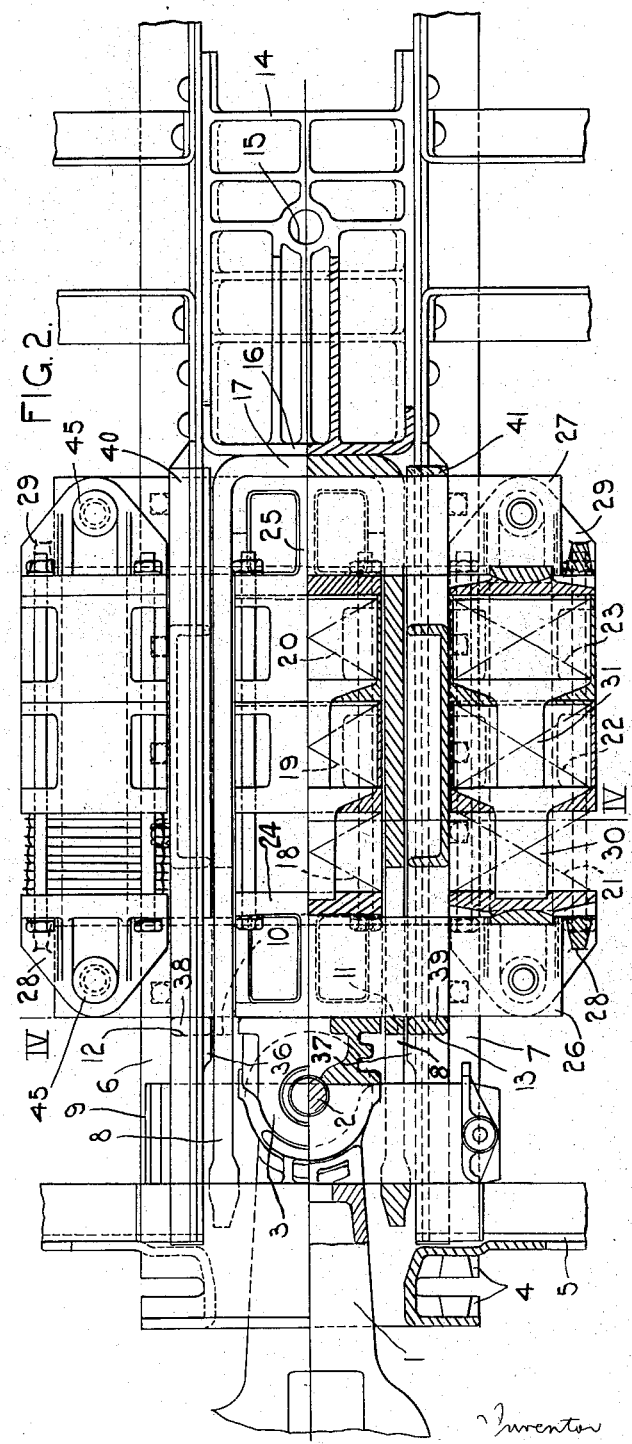
Inventor
Richard Thomson Glascodine
By Pennie Davis Marvin Edmonds
attorneys Aug. 11, 1936.  R. T. GLASCODINE  2,050,604
CENTRAL BUFFING AND DRAFT GEAR
Filed Nov. 8, 1934   2 Sheets-Sheet 2
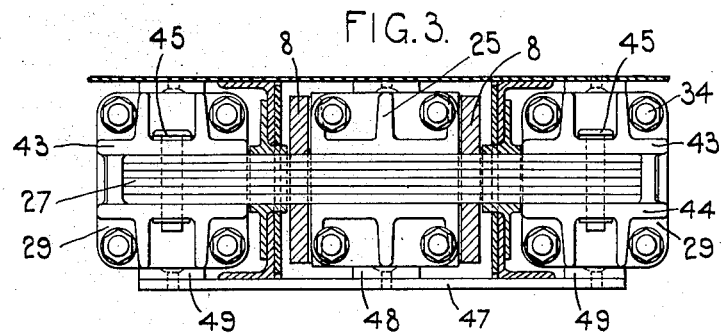
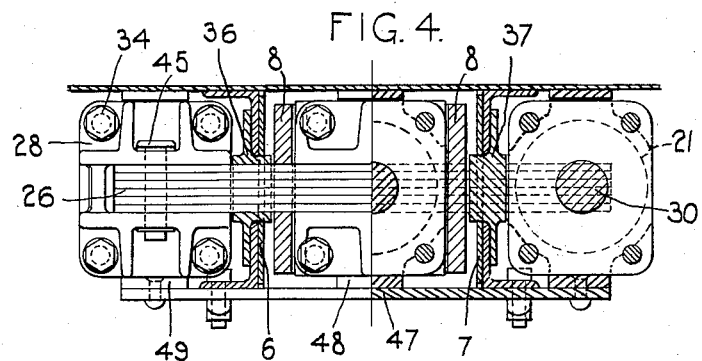
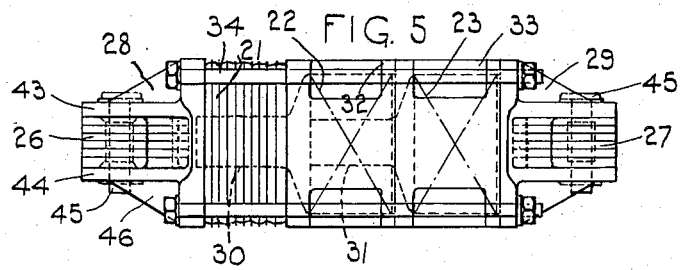

Patented Aug. 11, 1936

2,050,604

UNITED STATES PATENT OFFICE 2,050,604

CENTRAL BUFFING AND DRAFT GEAR

Richard Thomson Glascodine, Westminster, London, England

Application November 8, 1934, Serial No. 751,975
In Great Britain July 4, 1934

13 Claims. (Cl. 213—7)

This invention relates to central buffing and draft gear with more especial reference to arrangements wherein the rear of the coupler shank is connected to a yoke disposed between the centre sills of the vehicle and actuating springs or other buffing and draft shock absorbing or cushioning devices.

The space between the main centre sills or longitudinals of railway vehicles is limited and with the increase in size of passenger cars and freight trucks is, in many cases, inadequate to house the shock absorbing or cushioning devices of high capacity desirably utilized with such vehicles, particularly where outside buffers are absent.

Proposals have hitherto been made to supplement the cushioning devices located between the sills with additional devices located outside the sills, for instance in British Specification No. 342,882 compression members in the form of massive transverse castings actuated by the yoke extended through slots in the centre sills to operate springs at each side thereof under both buffing and draft shocks. Such arrangements hitherto known, however, are subject to two disadvantages, firstly, in the massive nature of the transverse members by which the outer springs are operated which take up valuable space and considerably increase the weight of the gear, and, secondly, in the necessity for extending the area of application at least of buffing shocks, for instance by means of lateral extensions on the casting mounting the bogie centre pin.

The present invention has for its object to provide an arrangement of yoke actuated buffing and draft gear including springs or other buffing and draft shock absorbing or cushioning devices on each side of the yoke not subject to these disadvantages and which is of light weight only occupying a minimum of additional useful space in the under part of the vehicle.

In accordance with the present invention, for the actuation of the outer springs or other devices flexible or resilient beams are employed extending transversely on each side of the yoke through slots in the centre sills and operating the outer springs by means of appropriate followers.

The flexible or resilient beams are advantageously constructed as described in co-pending application Serial No. 751,976, filed November 8, 1934, each comprising an assembly of tempered steel plates with their edges disposed in the direction in which the buffing and draft thrusts are transmitted and their flat faces at right angles thereto. Such beams, being made of tempered steel or like material, are capable of accommodating far greater pressures than would be the case with a beam made of forged or cast metal and having the limited strength of such metal.

Advantageously, the triple column buffing and draft gear according to the present invention comprises triplicate sets of India-rubber springs and each set may include two or three India-rubber springs arranged tandemwise and adapted to be compressed in parallel at least under major buff and draft stresses, whereby a capacity to cushion adequately even the heaviest blows likely to be met with is provided.

Parallel compression of the individual springs of each set may be had by means of the arrangement described in patent specification No. 1,897,288, the front and rear followers for the outer springs being webbed or otherwise appropriately formed to receive and mount the ends of the flexible or resilient beams.

The invention will be further described with reference to the accompanying drawings which illustrate by way of example and partly diagrammatically one embodiment thereof, and in which,—

Fig. 1 is a longitudinal vertical section of the portion of the vehicle including the buffing and draft gear, Fig. 2 being a horizontal section showing the transverse disposition of the three columns of buffing and draft springs.

Fig. 3 is a transverse section on the line III—III of Fig. 1, and Fig. 4 is a similar section on the line IV—IV of Fig. 2, while Fig. 5 is a detail side elevational view of one of the outside columns of springs.

Referring now to the drawings, 1 indicates the shank of an automatic coupler vertically pivoted at 2 to a sliding block or casting 3 and centralized in any appropriate manner, for instance by means of centralizing gear carried in a depending housing indicated at 4 on the front of the headstock or end sill 5.

The main draft or centre sills of the vehicle are designated 6 and 7 and horizontally disposed between such sills is a yoke 8, the limbs whereof are operatively connected to the coupler shank 1 by a transverse cotter 9 as customary, the cotter 9 passing through elongated slots 10 and 11 in the arms of the yoke and also through elongated slots 12 and 13 in the centre sills.

Behind the yoke 8 the centre sills 6 and 7 are bridged by a robust casting 14 forming the centre of the transom and providing a bearing 15 for the bogie centre pivot. The casting 14 also has an enlarged flat front face 16 constituting a buffing abutment for the rear cross member 17 of the yoke 8.

Within the yoke is a column of three springs diagrammatically represented at 18, 19, and 20, and at each side of the yoke within the centre sills 6 and 7 is a similar column of three springs indicated at 21, 22, and 23, the three columns of springs being arranged to operate in unison when either buffing or drawing in the manner hereinafter described.

Also within the yoke in front of the spring 18 is a box-like casting 24 having a flat vertical front face in abutment with the rear face of the block 3 and adapted to be forced rearwardly thereby when the coupler shank 1 moves inwardly under buffing thrusts, the casting 24 compressing the springs 18, 19, and 20 against a similar casting 25 also within the yoke but at the rear end thereof between the cross member 17 and the rearmost spring 20 of the centre column.

The castings 24 and 25 are formed with horizontal rectangular openings in which are positioned front and rear transverse beams designated respectively 26 and 27, the front beam 26 extending on each side of the casting 24 through elongated slots in the limbs 8 of the yoke, and similarly elongated slots in the centre sills 6 and 7 to front followers 28 for the outside springs.

Similarly, the rear transverse beam 27 extends on each side of the casting 25 through slots in the yoke and elongated slots in the centre sills to rear followers 29 for the outside springs.

The detail of the outside spring shown in Fig. 5 clearly indicates the manner in which parallel compression of the three springs 21, 22, and 23 can be had upon mutual approach of the front and rear followers 28 and 29, intermediate followers being equipped with stools 30 and 31 and peripheral flanges 32 and 33, according to patent specification No. 1,897,288, for this purpose, although it will be appreciated that any other arrangement could be adopted whereby compression of the springs in parallel at least under major buff and draft stresses obtains.

Tie bolts 34, of which there are four for each column of springs, bridge the front and rear followers 28 and 29 and determine the initial compression to which the springs 21, 22, and 23 are adjusted, it being understood that these springs are preferably India-rubber springs composed of a plurality of metal plates, India-rubber elements projecting from opposite faces of the plates, metal separating plates being interposed between adjacent spring units.

In operation, for instance when buffing, the coupler shank 1 is moved rearwardly, actuating the front follower 24, and, by means of the transverse beam 26, the front followers 28, to compress the three columns of springs against the rear beam 27 which is in abutment with the rear end 17 of the yoke, in turn held by the pressure against the flat front face 16 of the casting 14 mounting the bogie centre pivot.

When drawing, the coupler shank 1 moves forwardly and takes with it the yoke and the rear resilient beam 27, thereby compressing the three columns of springs against the front beam 26 which is in abutment with the ends of the elongated slots in the centre sills.

Any usual or appropriate form of reinforcement may be applied to the draft portion of the centre sills, a suitable reinforcement being illustrated and taking the form of supplementary castings 36, 37 extending for the length of the gear, riveted to the sills, and correspondingly slotted for the passage of the transverse beams 26 and 27 operating the outside springs.

Frontal abutments 38, 39 are conveniently formed on such casting for the front beam 26, and similarly rear abutments 40 and 41 are formed thereon for the rear transverse beam 27, and while it is not necessary to provide any such rear abutments in the sills themselves, they are desirably furnished, since they distribute the incidence of the buffing thrusts instead of permitting these to be localized at the centre casting 14.

The manner in which the front and rear transverse beams 26 and 27 are connected to their respective followers 28 and 29 for the outside springs, is clearly shown particularly in Figs. 2, 4, and 5, the several followers being identical and each being furnished with lateral ribs 43 and 44 spaced apart sufficiently to receive between them the beams such as 26. A securing bolt 45 passes through aligned apertures in the ribs 43 and 44 and the laminae of the beam, thus operatively connecting the followers to the beam, while webs 46 extending between the main body of the followers and the ribs 43 and 44 permit of these being made as light castings and still have sufficient strength for their purpose.

The transverse beams 26 and 27, by which the outside springs are actuated, are of the laminated nature described in the aforementioned co-pending application Serial No. 751,976, each beam being composed of six flat rectangular plates of spring steel united at their extremity by the bolts 45 and, it may be, between the ends by rivets or ferrules, resilient beams of this nature possessing the double advantage when employed in the manner described for the actuation of the outside springs in that for the same strength they are considerably lighter than the massive beams of forged material hitherto employed, and, secondly, by reason of their partially resilient nature they serve to accommodate some of the shock under heavy buffing thrusts, thereby providing as it were a yielding member of the structure which reduces the intensity of stress due to that portion of the blow usually carried by the structure as distinct from the buffer.

It will be appreciated that any desired distribution of pressure between the triplicate springs may be effected, for instance by means of packing plates or by adjusting the initial compression of the respective springs or by arranging the springs of the inside or outside columns to act first in series under light thrusts and only in parallel under heavier buffing thrusts.

Mounted underneath the centre sills and extending for approximately the full length of the buffing and draft gear is a foot plate or bearer 47 upon which renewable tread plates 48 for the centre springs and 49 for the two outside springs are secured, the followers whereof are adapted to ride on their respective plates during the operation of the gear when cushioning buff or draft shocks, and while in the embodiment illustrated the yoke is disposed horizontally, it will be appreciated that a similar triple column arrangement of springs could also be made with a vertically disposed yoke, in which case the centre portion of the foot-plate 47 would be omitted to leave sufficient space between the centre sills for the lower limb of the yoke.

As aforementioned the springs may be replaced by friction gear or other buffing and draft shock absorbing or cushioning devices, the characteristics of the spring beams suiting them eminently for combination with friction gear.

By the present invention central buffing and draft gear of high capacity and light weight is obtained wherein the incidence of intense shocks when either buffing or drawing is distributed, thereby reducing the localized stress in the coupler shank and in the car structure about the gear.

What I claim is:—

1. In a buffing and draft gear for railway vehicles, a coupler having a coupling head and a shank, a pair of transversely extending crossheads comprising spring steel plates stacked with their breadths in the direction of the buff and draft stresses, cushioning means located between said cross-heads, and means for causing said cross-heads to be forced towards each other and to compress said cushioning means upon longitudinal movement of the coupler shank in either direction.

2. In a buffing and draft gear for railway vehicles, a coupler having a coupling head and a shank, a pair of transversely extending crossheads comprising spring steel plates stacked with their breadths in the direction of the buff and draft stresses, a plurality of cushioning means located between said cross-heads with at least one of said cushioning means being located at each side of the major longitudinal axis of the coupler shank and means for causing said crossheads to be forced towards each other and to compress said cushioning means upon longitudinal movement of the coupler shank in either direction.

3. In a buffing and draft gear for railway vehicles having an end sill and a pair of center sills, a coupler having a coupling head and a shank, a pair of transversely extending crossheads comprising spring steel plates stacked with their breadths in the direction of the buff and draft stresses, a plurality of cushioning means located between said cross-heads with at least one of said cushioning devices being located between the center sills and one at the outer side of each of said center sills, and means for causing said cross-heads to be forced towards each other and to compress said cushioning means upon longitudinal movement of the shank in either direction.

4. A buffing and draft gear as set forth in claim 1, in which the cushioning means comprises a plurality of cushioning elements arranged in tandem.

5. A buffing and draft gear as set forth in claim 3, in which the cushioning means comprises a plurality of cushioning elements arranged columnwise in tandem and operable in parallel at least under major buff and draft stresses.

6. A buffing and draft gear as set forth in claim 3 in which the cushioning means includes a plurality of spring units each of which comprises a foundation plate and India-rubber elements secured to said plate and projecting from opposite faces thereof, and in which separating plates are interposed between adjacent units of the cushioning means.

7. In a buffing and draft gear for railway vehicles having an end sill and a pair of center sills, a coupler having a coupling head and a shank, a yoke located between said center sills, a pair of crossheads extending transversely through the legs of said yoke, said crossheads comprising spring steel plates stacked with their breadths in the direction of the buff and draft stresses, cushioning means embraced by said yoke, supplementary cushioning means located at the outer side of each of said center sills between said crossheads, and means for causing said cross-heads to be forced towards each other to compress the cushioning means upon longitudinal movement of the coupler shank in either direction.

8. In a buffing and draft gear for railway vehicles having an end sill and a pair of center sills, a coupler having a coupling head and a shank, a yoke located between said center sills and having slots in the legs thereof, a pair of cross-heads extending transversely through the slots in said yoke and having their ends protruding beyond the respective legs of the yoke, said crossheads comprising spring steel plates stacked with their breadths in the direction of the buff and draft stresses, cushioning means located between said center sills and embraced by said yoke, supplementary cushioning means located at the outer sides of said center sills and positioned between the protruding ends of said cross-heads, and means for causing the cross-heads to be forced towards each other to compress the cushioning means upon longitudinal movement of the coupler shank in either direction.

9. A buffing and draft gear as set forth in claim 8 in which the slots in the yoke through which at least one of the cross-heads extend is of a length greater than the width of the crosshead whereby there may be relative movement between said cross-head and yoke.

10. In a buffing and draft gear for railway vehicles having an end sill and a pair of center sills, a coupler having a coupling head and a shank, a yoke located between said center sills and having slots in the legs thereof, a pair of resilient cross-heads extending transversely through slots in said yoke and having their ends protruding beyond the respective legs thereof, said crossheads comprising spring steel plates stacked with their breadths in the direction of the buff and draft stresses, cushioning means embraced by said yoke, followers pivotally secured to the outer ends of said cross-heads, supplementary cushioning means located at the outer side of each of said center sills and positioned between said followers, and means for causing the cross-heads to be forced towards each other to compress the cushioning means upon longitudinal movement of the coupler shank in either direction.

11. In a buffing and draft gear for railway vehicles having an end sill and a pair of center sills, a coupler having a coupling head and a shank, a yoke located between said center sills and having slots extending transversely through the legs thereof, a pair of resilient cross-heads extending transversely through and movable longitudinally in said slots, said cross-heads comprising spring steel plates stacked with their breadths in the direction of the buff and draft stresses and having their ends protruding beyond the respective legs of the yoke, cushioning means located between said center sills and embraced by said yoke, supplementary cushioning means located at the outer sides of said center sills and positioned between the protruding ends of said cross-heads, means for causing the crossheads to be forced towards each other to compress the cushioning means upon longitudinal movement of the coupler shank, and means for limiting forward movement of the front cross-head and rearward movement of the rear cross-head in said slots.

12. A buffing and draft gear as set forth in claim 11, in which the center sills are reinforced by supplementary castings secured thereto, which castings are also slotted to accommodate the transversely extending cross-heads and carry frontal and rear abutments for limiting the forward and rearward movement respectively of said cross-heads upon draft and buffing shocks.

13. A buffing and draft gear as set forth in claim 10 in which the pivoted followers each have a pair of lateral wings or ribs which receive between them the end of the respective actuating cross-head, and which followers are secured to the cross-heads by a bolt passing through a line of apertures in said wings and in the cross-head.

RICHARD THOMSON GLASCODINE.